United States Patent
Jaenker

(10) Patent No.: US 6,411,009 B2
(45) Date of Patent: Jun. 25, 2002

(54) PIEZOELECTRIC ACTUATOR SYSTEM

(75) Inventor: Peter Jaenker, Garching (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/740,655

(22) Filed: Dec. 18, 2000

(30) Foreign Application Priority Data

Dec. 17, 1999 (DE) .......................................... 199 61 068

(51) Int. Cl.$^7$ ............................................... H01L 41/04
(52) U.S. Cl. .................... 310/316.01; 310/317; 310/328
(58) Field of Search ........................ 310/316.01, 316.03, 310/317, 328; 318/118

(56) References Cited

U.S. PATENT DOCUMENTS

| | | | |
|---|---|---|---|
| 4,570,095 A | | 2/1986 | Uchikawa |
| 4,703,215 A | | 10/1987 | Asano |
| 4,706,230 A | | 11/1987 | Inoue et al. |
| 4,767,959 A | * | 8/1988 | Sakakibara et al. ......... 310/317 |
| 4,769,569 A | | 9/1988 | Stahlhuth |
| 4,808,874 A | | 2/1989 | Stahlhuth |
| 4,933,591 A | | 6/1990 | Stahlhuth |
| 4,937,489 A | | 6/1990 | Hattori et al. |
| 4,952,835 A | | 8/1990 | Stahlhuth |
| 5,130,598 A | * | 7/1992 | Verheyen et al. ........... 310/316 |
| 5,319,257 A | | 6/1994 | McIntyre |
| 5,936,644 A | * | 8/1999 | Ono et al. .................... 347/10 |
| 6,037,701 A | * | 3/2000 | Atsuta .................... 310/316.01 |
| 6,081,061 A | * | 6/2000 | Reineke et al. ......... 310/316.03 |
| 6,147,433 A | * | 11/2000 | Reineke et al. ......... 310/316.03 |
| 6,157,115 A | * | 12/2000 | Hassler ........................ 310/328 |
| 6,177,753 B1 | * | 1/2001 | Atsuta .................... 310/316.01 |
| 6,276,772 B1 | * | 8/2001 | Sakata et al. .................. 347/10 |
| 6,294,859 B1 | * | 9/2001 | Jaenker ........................ 310/328 |

OTHER PUBLICATIONS

Fachbeilage Mikroperipherik, me Bd.4 (1990) Heft 6 "Piezoelektrische Aktoren"; Salomon, Schadebrot; pp. 88 to 91 in German periodical DE–Z Mikroelektronik.

"Development of High Performing Piezoelectric Actuators for Transport Systems", by Peter Jaenker et al.; an article published at the "Actuator 98" Conference in Bremen Germany on Jun. 17 to 19, 1998.

\* cited by examiner

*Primary Examiner*—Nestor Ramirez
*Assistant Examiner*—Peter Medley
(74) *Attorney, Agent, or Firm*—W. F. Fasse; W. G. Fasse

(57) ABSTRACT

A piezoelectric actuator has at least two piezoelectric actuator elements connected in series with each other mechanically and electrically and form a half bridge in an amplifier bridge circuit having a further half bridge formed by two series connected electronic switches which are operated or clocked by a control circuit such as a pulse modulator circuit for periodically energizing the piezoelectric actuators in push-pull fashion. A choke (22) is connected between the junction point (JP1) of the two piezoelectric actuators and the junction point (JP2) between the two electronic switches (23, 24) for assuring a loss free reverse charging of the two piezoelectric actuators functioning as electrical capacitors in the energizing bridge circuit (21). The choke 22 functions as an energy storage and the stored energy is used in the push-pull charging of the capacitors (19, 20) formed by the piezoelectric elements.

10 Claims, 2 Drawing Sheets

PIEZOELECTRIC ACTUATOR SYSTEM

CROSS-REFERENCE TO RELATED APPLICATION

The present application relates to U.S. Ser. No. 09/150,356, filed on Sep. 9, 1998 by the same inventor and entitled "ELECTROSTRICTIVE OR PIEZOELECTRIC ACTUATOR WITH A STROKE AMPLIFYING TRANSMISSION MECHANISM".

PRIORITY CLAIM

This application is based on and claims the priority under 35 U.S.C. §119 of German Patent Application 199 61 068.1, filed on Dec. 17, 1999, the entire disclosure of which is incorporated herein by reference.

1. Field of the Invention

The invention relates to a piezoelectric actuator system comprising at least two piezoelectric actuators mechanically arranged in series for producing an output motion or power.

2. Background Information

Piezoelectric actuators have the advantage of a high actuating precision and a fast reaction. Such actuators are components with a high electrical capacity whereby only part of the electrical energy supplied to the actuators is converted to mechanical energy. A large part of this energy is stored in the piezoelectric actuator functioning as a capacitor.

In a dynamic, repetitious or continuos operation of a piezoelectric actuator, considerable electrical power in the form of apparent power flows through the actuator. This apparent electrical power has to be supplied by the driver circuit of the actuator. In the case of periodic driving or energizing the piezoelectric actuator is electrically alternately charged and discharged, whereby electrical energy is cyclically supplied to and withdrawn from the piezoelectric actuator. In known driver circuits for periodic or repetitious driving of the piezoelectric actuator, the stored electrical energy is dissipated during the discharge phase or cycle in the driver or control circuit which has for example an ohmic resistance for the dissipating.

The German Patent Publication DE 197 39 594 C1 describes the use of driver circuits for actuator systems in which energy is dissipated during the discharge cycle. To achieve higher output forces and/or thermal compensation, two piezoelectric actuators are mechanically arranged in series and clamped against each other. In the known system the piezoelectric actuators are symmetrically driven in push-pull fashion so that with the stroke remaining the same, the output forces of the two piezoelectric actuators are added together. Thermal expansions of the piezoelectric actuators compensate each other in the known arrangement and a bias spring commonly used in such piezoelectric actuators is not required.

European Patent Publication EP 0 676 036 B1 describes trimorphic bending piezoelectric actuators with an energy dissipating driver circuit. A trimorphic bending actuator comprises a carrier or base plate with piezoelectric elements glued to both sides of the base plate which functions as one electrode. Both piezoelectric elements form electrical capacitors which are electrically driven reciprocally or in push-pull fashion.

OBJECTS OF THE INVENTION

In view of the above it is the aim of the invention to achieve the following objects singly or in combination:

to create a power-saving piezoelectric actuator system which operates periodically or continuously and is driven or energized in push-pull fashion;

to store and use energy, that is conventionally dissipated, in the reverse charge phase of twin piezoelectric actuators; and to minimize the recharging or reverse charging energy in a piezoelectric actuator having at least two actuator elements.

SUMMARY OF THE INVENTION

According to the invention, there is provided a piezoelectric actuator system characterized by an amplifier bridge circuit including a first piezoelectric actuator forming a first quarter bridge branch, a second piezoelectric actuator forming a second quarter bridge branch, said first and second quarter bridge branches being connected in series with each other to form a first half bridge having a first junction point between said first and second piezoelectric actuators, a first electronic switch forming a third quarter bridge branch, a second electronic C1 switch forming a fourth quarter bridge branch, said third and fourth quarter bridge branches being connected in series with each other to form a second half bridge having a second junction point between said first and second electronic switches, said first and second half bridges being connected in parallel with each other to form a full bridge including a third junction point between said first and second half bridges to form a bridge power input and a normally grounded fourth junction point between said first and second half bridges opposite said power input, a choke connected to said first and second junction points, a power supply ($U_+$) connected to said third junction point forming said bridge power input, and a control circuit connected to said first and second electronic switches for opening and closing said electronic switches to energize said first and second piezoelectric actuator's.

The solution according to the invention provides the advantage that the electrical energy stored in the piezoelectric actuators is not dissipated in the driver circuit formed by the electronic switches and a control circuit of the actuator system. Instead the energy is recovered and used again with the aid of the choke. Furthermore, the above-mentioned advantages of an automatic thermal compensation are also achieved in the piezoelectric driver system according to the invention.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
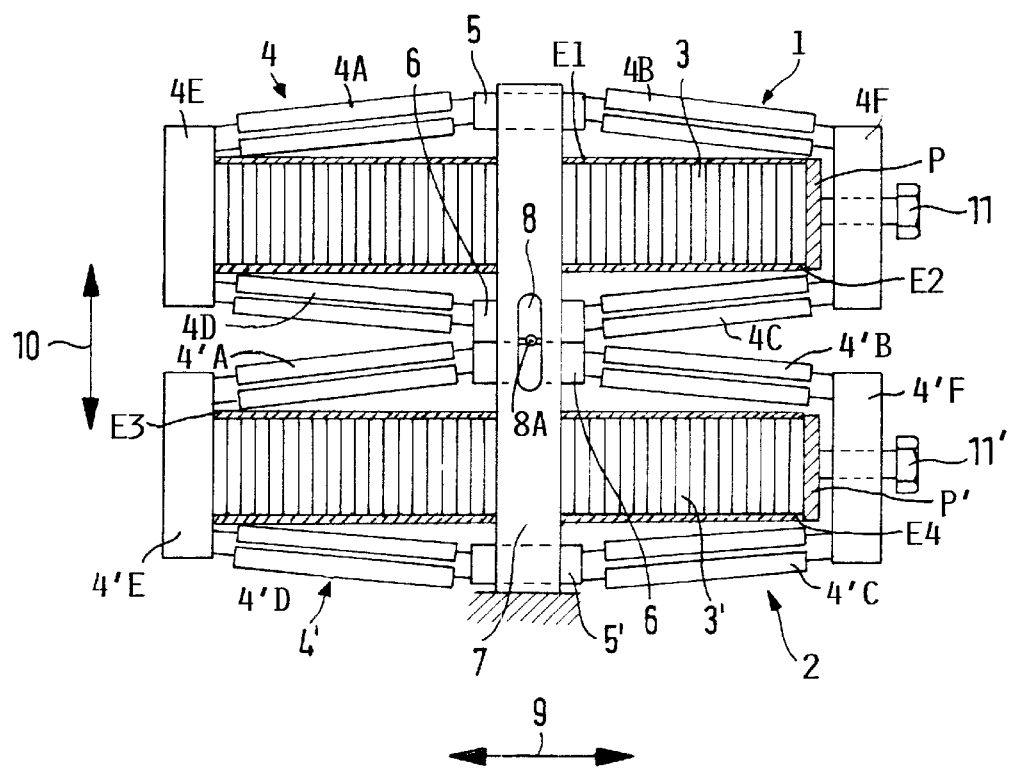
FIG. 1 shows an example embodiment of a mechanical arrangement of two piezoelectric actuators arranged mechanically and electrically in series to act in push-pull fashion according to the invention.

FIG. 1 shows an actuator system according to the invention with two piezoelectric actuators 1 and 2, each formed by a respective piezoelectric stack 3,3' held in a respective articulated frame 4, 4'. The frame 4 comprises a support plate 5 and an output member such as a plate 6 positioned opposite each other. The Ago frame 4 further comprises four connector rods 4A, 4B, 4C and 4D articulated to the base plate 5 and to the output plate 6. The frame 4 also has a first end plate 4E and a second end plate 4F. The four connector rods are also articulated to these first and second end plates 4E and 4F. The base plate 5 is rigidly secured to a support frame 7. The output plate 6 is movably guided in a guide slot 8 of the support frame 7, whereby a power output pin 8A or the like secured to the output plate 6 is movably guided in the guide slot 8 of the support frame 7. The second frame 4' comprises identical elements 4'A, 4'B, 4'C, 4'D, 4'E, 4'F and a fixed base plate 5'. The output plate 6 is provided in common for both frames 4 and 4'. These elements of the frame 4' are assembled in the same way as described above with reference to the frame 4.

Each of the frames 4, 4' for holding the two piezoelectric stacks 3, 3' is provided with an adjustment screw 11, 11' passing through a respective threaded hole in the corresponding end plate 4F and 4'F and bearing against pressure plates P, P' respectively. These pressure plates are preferably electrically insulated from the respective stack. The screws 11, 11' are used for calibrating the respective piezoelectric stack 3, 3' to a zero position when the stack is not energized. In a properly calibrated actuator, the output pin 8A is centered in the guide slot 8, for example.

For energizing the piezoelectric stacks 3, 3' each stack has two electrodes. The stack 3 has electrodes E1 and E2. The stack 3' has electrodes E3 and E4. The electrodes E2 and E3 are electrically interconnected to form, for example the junction point JP1 in FIG. 3. Electrode E1 will be connected to junction point JP3 and electrode E4 will be connected to junction point JP4 in FIG. 3, for example as will be described in more detail below.

When an electrical energizing voltage is applied to the electrodes E1 and E3 on the one hand and to electrode E1 or E4 on the other hand, the piezoelectric stacks 3, 3' expand or contract in push-pull fashion in the direction of the arrow 9. This movement of the piezoelectric stacks is transmitted to the articulated frames 4, 4' holding said piezoelectric stacks 3, 3', whereby the support plates 5, 5' and the output plate 6 of said articulated frames move away from each other or toward each other in the direction of the arrow 10. The extent of the motion of the output pin 8A is amplified relative to the motion of the piezoelectric stacks 3, 3' by the articulated frame structures 4 and 4' in which the piezoelectric actuators 1 and 2 are mechanically arranged in series and held in the support frame 7 provided for both articulated frames 4, 4'. For this purpose the support plates 5, 5' of the piezoelectric actuators 1 and 2 are mounted to opposite ends of the support frame 7. The centrally positioned output plate 6 acts in response to the motions of both piezoelectric stacks in push-pull fashion, thus providing a common output for both stacks 3, 3' of the actuator system whereby the pin 8A carries out its working stroke in the guide slot 8 of the support frame 7. The piezoelectric actuators 1 and 2 are driven electrically in opposition or in push-pull fashion so that one stack pulls while the other stack pushes and vice versa. As a result the output pin 8A departs from the zero position which is adjustable by the calibration screws 11, 11' as described above.

Figure 2:
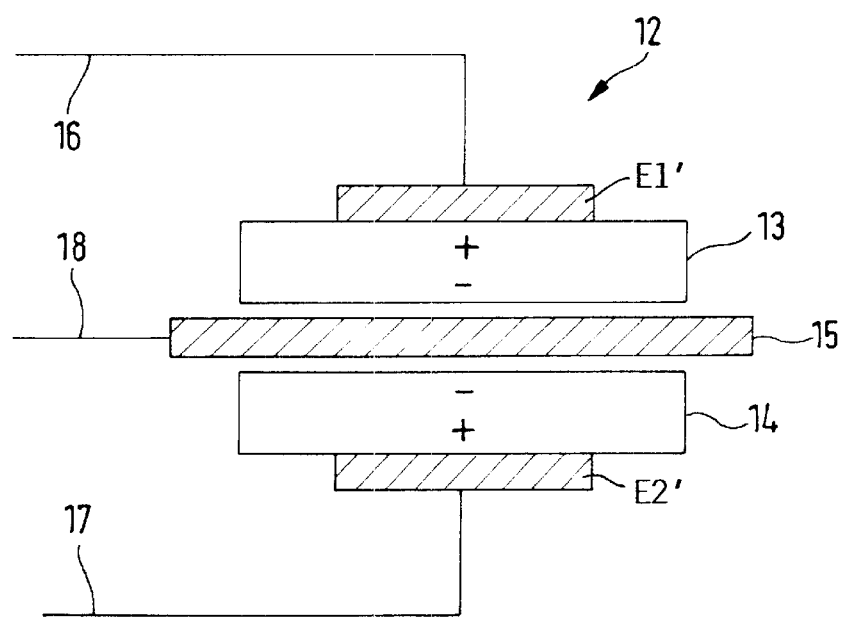
FIG. 2 shows an alternative mechanical arrangement of two piezoelectric actuators with three energizing electrodes whereby a base plate forms a common electrode for both actuators.

FIG. 2 shows another suitable mechanical serial arrangement 12 of two piezoelectric actuators 13 and 14 according to the invention. Two piezoelectric plates form the actuators 13 and 14 which are energized electrically by drive voltages having opposing polarities as shown in FIG. 2 to sustain a push-pull operation as in a known trimorphic bending actuator. The two piezoelectric plate actuators 13, 14 of the actuator 12 are arranged one on each side of a metal carrier plate that forms a central electrode 15 connected in an electrically conductive manner to the piezoelectric plate actuators 13, 14 for electrically driving the two plates in push-pull fashion. The two piezoelectric plate actuators 13 and 14 are connected through respective electrodes E1' and E2' to respective energy supply electrical conductors 16, 17. The control electrode 15 is connected to a supply conductor 18.

The solution according to the invention is not limited to the mechanical arrangements described above. Other alternative mechanical arrangements of two or more piezoelectric actuators are suitable for the purposes according to the invention as long as the arrangements of the piezoelectric actuators are energizable in push-pull fashion.

Figure 3:
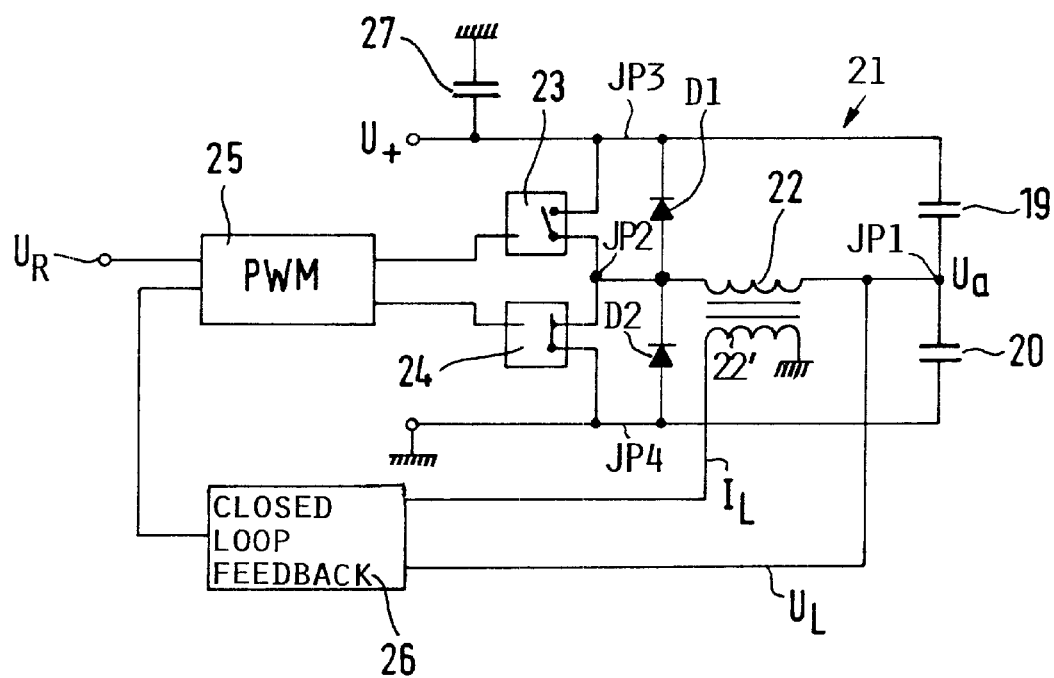
FIG. 3 shows an electrical bridge circuit diagram for energizing two piezoelectric actuators and including an energy storing impedance or choke according to the invention.

FIG. 3 shows a schematic electrical circuit diagram according to the invention. The piezoelectric actuator system is constructed as a push-pull system comprising a clocked amplifier bridge 21 wherein the two electrically and mechanically serially connected piezoelectric actuators 1 and 2 of FIG. 1 or 13 and 14 of FIG. 2 form a first half bridge with a first junction point JP1 of the bridge circuit 21. In FIG. 3 the piezoelectric actuators are shown as capacitors 19 and 20 because the actuators function as capacitors in the bridge circuit 21.

The second half bridge is formed by two potential reversing electronic switches 23, 24 providing a second bridge junction point JP2. According to the invention, a choke 22 is connected between the junction points JP1 and JP2 of the first and second half bridges of the amplifier bridge circuit 21. The piezoelectric actuators are energized by an external supply voltage $U_+$ connected to a third junction point JP3. One end of each of the two half bridges is also connected to the third junction point JP3. The fourth bridge junction point connects the opposite ends of the two half bridges to ground. The two electronic switches 23 and 24 are so controlled that one switch is closed while the other is open and vice versa for repeatedly changing the potential of the energizing voltage at the terminals of the piezoelectric actuators 19 and 20 to operate these actuators in push-pull fashion. A control circuit 25 for controlling the operation of the electronic switches 23, 24 is preferably a pulse width modulator circuit PWM which in turn is controlled in closed loop fashion by a closed loop control circuit 26 of the actuator system.

According to the invention a choke 22 is connected between a first junction point JP1 and a second junction point JP2. The first junction point JP1 is formed between the two piezoelectric actuators shown as capacitors 19 and 20. The second junction point JP2 is formed between the two polarity reversing electronic switches 23, 24. The third junction point JP3 interconnects the supply voltage terminal $U_+$, one terminal of the electronic switch 23 and one terminal of the actuator 19. The fourth junction point JP4 interconnects ground with one terminal of the electronic switch 24 and one terminal of the actuator 20.

The pulse-width modulator switch control circuit 25 has one input corrected to a rated input voltage $U_R$. A control input of the control circuit 25 receives an output feedback control signal from a status closed loop control circuit 26 which acquires and processes the current value $I_L$ and the voltage actual values $U_L$ at the choke 22. For this purpose the choke 22 is preferably the primary winding of a transformer which has a secondary winding 22' one end of which is connected to one input terminal of the closed loop control circuit 26 and the other end of the secondary winding 22' is connected to ground. Another control input of the circuit 26 is connected to the first junction point JP1.

In the push-pull system described above the capacitors 19 and 20 are recharged during frequent operation by means of the clocked amplifier bridge 21. In this arrangement, the supply voltage U+is applied to the capacitors 19 and 20 but with repeatedly reversing polarities as controlled by the switches 23, 24.

The supply voltage $U_+$ is maintained by a voltage source (not shown) and a grounded blocking capacitor 27. As mentioned the choke 22 is connected between the output of the half bridge with the two electronic switches 23, 24 and the first junction point: JP1 of the two piezoelectric actuators 19, 20 in the other half bridge of the bridge amplifier circuit 21. The choke 22 serves as an energy storage thereby assuring a substantially loss-free recharging of the capacitors 19 and 20 in push-pull fashion by means of potential equalization between the control connection or junction point JP1 and the supply voltage $U_+$ during a clocked continuous operation. With switch 23 open and switch 24 closed as shown the potential at the junction point JP1 is Ua.

In this way it is possible to reverse charge the capacitors 19 and 20 substantially without any external energy supply. In this arrangement, the choke 22 functions as an intermediate energy storage device. Only the losses in the capacitors and the external dissipation need to be covered or provided by the voltage supply $U_+$. Due to the fact that the reverse recharging process of the capacitors according to the invention takes place almost without an external energy supply, the electrical power requirement for driving the piezoelectric actuators 1 and 2 has been considerably reduced according to the invention as compared to hitherto known solutions.

Incidentally, the diodes D1 and D2 connected in parallel to the switch 23, 24 respectively function as protection diodes to prevent current flow in a wrong direction.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A piezoelectric actuator system comprising an amplifier bridge circuit (21) including a first piezoelectric actuator (1, 19) forming a first quarter bridge branch, a second piezoelectric actuator (2, 20) forming a second quarter bridge branch, said first and second quarter bridge branches being connected in series with each other thereby forming a first half bridge having a first junction point (JP1) between said first and second piezoelectric actuators (1,19;2,20), a first electronic kilo switch (23) forming a third quarter bridge branch, a second electronic switch (24) a fourth quarter bridge branch, said third and fourth quarter bridge branches being connected in series with each other thereby forming a second half bridge comprising a second junction point (JP2) between said first and second electronic switches (23, 24), said first and second half bridges being connected in parallel with each other to form a full bridge, a third junction point (JP3) between said first and second half bridges, and a normally grounded fourth junction point (JP4) between said first and second half bridges, a choke (22) connected to said first and second junction points (JP1, JP2), a power supply ($U_+$) connected to said third junction point (JP1), and a control circuit (25) connected to said first and second electronic switches (23, 24) for opening and closing said electronic switches to energize said first and second piezoelectric actuators.

2. The piezoelectric actuator system of claim 1, wherein said control circuit (25) is a pulse-width modulator circuit having a first control output connected to said first electronic switch (23) and a second control output connected to said second electronic switch (24) for operating said first and second electronic switches (23, 24) in alternate fashion so that said first and second piezoelectric actuators are operable in a push-pull fig fashion.

3. The piezoelectric actuator system of claim 1, further comprising a first articulated guide frame (4) in which said first piezoelectric actuator (1) is operatively mounted, a second articulated guide frame (4') in which said second piezoelectric actuator (2) is operatively mounted, a support frame (7), each of said guide frames (4, 4') comprising a base plate (5, 5') articulated to the respective guide frame and rigidly secured to said support frame (7), and a movable power output member (6) articulated to said first and second guide frames (4, 4') and movably guided by said support frame (7), whereby said first and second guide frames (4, 4') are clamped against each other in such a way that said movable power output member (6) is drivable by both piezoelectric actuators (1, 2) and wherein said first and second piezoelectric actuators are energizable in said amplifier bridge circuit in opposition to each other for operating in push-pull fashion.

4. The piezoelectric actuator system of claim 3, wherein each of said first and second articulated guide frames (4, 4') comprises first and second end plates (4E, 4F; 4'E, 4'F) between which said piezoelectric actuators are held in place, and wherein one end plate (4F, 4'F) of each articulated guide frame comprises an adjustment device (11) for calibrating the respective piezoelectric actuator to a zero or centered position of said movable power output member (6).

5. The piezoelectric actuator system of claim 1, wherein said first and second piezoelectric actuators comprise a common electrode (15) and two individual electrodes (E1', E2') with piezoelectric elements (13, 14) positioned between said common electrode on one side and one of said individual electrodes on the other side of the respective piezoelectric element.

6. The piezoelectric actuator system of claim 5, wherein said common electrode is connected to said first junction point (JP1), wherein one of said individual electrodes (E1) is connected to said third junction point (JP3) and the other individual electrode (E2) is connected to said fourth junction point (JP4), whereby said first half-bridge is formed.

7. The piezoelectric actuator system of claim 5, wherein said control circuit (25) is a pulse-width modulator circuit having a first control output connected to said first electronic switch and a second control output connected to said second electronic switch for operating said first and second electronic switches (23, 24) in alternate fashion so that said first and second piezoelectric actuators are operable as a push-pull device.

8. The piezoelectric actuator system of claim 5, wherein said first and second piezoelectric actuators are formed as a trimorph piezoelectric bending actuator.

9. The piezoelectric actuator system of claim 1, wherein said first and second piezoelectric actuators are mechanically and electrically connected in series with each other.

10. The piezoelectric actuator system of claim 1, further comprising a feedback circuit (26), a transformer comprising a primary winding connected to said first and second junction points and functioning as said choke and a secondary winding connected to said feedback circuit, said feedback circuit comprising a feedback signal output terminal connected to said control circuit (25) for a closed loop feedback control of the operation of said first and second electronic switches.

* * * * *

UNITED STATES PATENT AND TRADEMARK OFFICE
CERTIFICATE OF CORRECTION

PATENT NO.    : 6,411,009 B1
DATED         : June 25, 2002
INVENTOR(S)   : Jaenker It is certified that error appears in the above-identified patent and that said Letters Patent is hereby corrected as shown below:

Column 2,
Line 20, after "electronic", delete "C1".

Column 3,
Line 4, after "the", delete "Ago";

Column 5,
Line 55, after "electronic", delete "kilo";
Line 67, after "point", replace "(JP1)" by -- (JP3) --;

Column 6,
Line 12, after "push-pull", delete "fig".

Signed and Sealed this

Twenty-sixth Day of November, 2002

Attest:

Attesting Officer

JAMES E. ROGAN
Director of the United States Patent and Trademark Office